United States Patent [19]

Topouzian et al.

[11] Patent Number: 5,544,726
[45] Date of Patent: Aug. 13, 1996

[54] BRAKE ROTOR WITH FLOW THROUGH VENTILATION

[75] Inventors: Daron Topouzian, West Bloomfield; James E. Riley, Northville, both of Mich.

[73] Assignee: Ford Motor Company, Dearborn, Mich.

[21] Appl. No.: 301,447

[22] Filed: Sep. 6, 1994

[51] Int. Cl.⁶ ........................ F16D 65/12
[52] U.S. Cl. .................. 188/264 A; 188/218 XL
[58] Field of Search .......... 188/18 A, 218 XL, 188/264 A, 264 AA; 192/113.2, 113.21, 113.23

[56] References Cited

U.S. PATENT DOCUMENTS

| | | | |
|---|---|---|---|
| 2,197,232 | 4/1940 | Wood | 351/72 |
| 2,369,328 | 2/1945 | Watts | 188/264 A |
| 2,451,709 | 10/1948 | Baselt | 188/218 XL |
| 3,171,527 | 3/1965 | Ott | 188/264 A |
| 3,394,780 | 7/1968 | Hodkinson | 188/218 XL |
| 3,486,218 | 12/1969 | Buyze | 219/121.14 |
| 4,501,346 | 2/1985 | Bogenschutz | 188/218 XL |
| 4,638,891 | 1/1987 | Wirth | 188/218 XL |
| 4,712,656 | 12/1987 | Courtois | 188/218 XL |
| 4,811,822 | 3/1989 | Estaque | 188/264 A |
| 4,865,167 | 9/1989 | Giorgetti et al. | 188/218 XL |
| 4,913,266 | 4/1990 | Russell et al. | 188/18 A |
| 4,930,606 | 6/1990 | Sporzynski et al. | 188/218 XL |
| 4,982,127 | 1/1991 | Marandet | 310/105 |
| 5,005,676 | 4/1991 | Gassiat | 188/218 XL |
| 5,161,652 | 11/1992 | Suzuki | 188/218 XL |
| 5,325,941 | 7/1994 | Farinacci et al. | 188/218 XL |

FOREIGN PATENT DOCUMENTS

| | | | |
|---|---|---|---|
| 0512853 | 11/1992 | European Pat. Off. | 188/218 XL |
| 2033033 | 7/1970 | Germany . | |
| 2557649 | 6/1977 | Germany . | |
| 4210449 | 10/1993 | Germany | 188/218 XL |
| 4323782 | 1/1994 | Germany | 188/218 XL |
| 58-49545 | 3/1983 | Japan . | |
| 5-346127 | 12/1993 | Japan | 188/218 XL |
| 1079081 | 8/1967 | United Kingdom . | |
| 2136921 | 9/1984 | United Kingdom | 188/218 XL |

*Primary Examiner*—Robert J. Oberleitner
*Assistant Examiner*—Chris Schwartz
*Attorney, Agent, or Firm*—Gregory P. Brown; Roger L. May

[57] ABSTRACT

A low mass brake rotor apparatus with flow through ventilation is disclosed for enhanced cooling performance and improved resistances to thermal distortion. The brake rotor apparatus comprises bifurcated radial cooling ducts to maintain predetermined cooling medium velocity therethrough for optimal heat convection. Balanced heat conduction is achieved to minimize thermal distortion by providing symmetrically oriented rubbing surfaces with equivalent thermal conduction load paths.

2 Claims, 2 Drawing Sheets

BRAKE ROTOR WITH FLOW THROUGH VENTILATION

BACKGROUND OF THE INVENTION

1. Field of the Invention

This invention relates to brake rotors for use in motor vehicles. More particularly, the present invention relates to a brake rotor having flow through ventilation cooling ducts.

2. Disclosure Information

Ventilated brake rotors used in disc brake assemblies are well known in the automotive brake art for improving the heat transfer to the ambient air. Heat is generated in the brake rotor as the kinetic energy of the moving vehicle is converted to heat energy through the frictional interface between brake pads forcibly applied against the brake rotor. One problem presented in managing the heat generated is preventing warping or coning of the brake rotor. Unequal temperature distribution in the brake rotor between rubbing surfaces leads to thermal stresses which may distort the brake rotor, known as warping and coning. Customers recognize these conditions through either increased brake pedal travel, or roughness felt in the brake pedal under moderate braking.

Another problem related to heat management in brake rotor design is controlling the rubbing surface temperature. As the temperature in the brake rotor increases during repetitive heavy stopping, the frictional properties at the brake interface diminishes above a predetermined temperature. Additionally, preventing the rubbing surfaces from exceeding a predetermined temperature also provides greater durability for the brake rotor.

Finally, heat management has been one of the primary obstacles to designing a successful brake rotor constructed from a lower density material than cast iron or steel. The most suitable materials require a brake rotor design having rubbing surfaces which operates at a significantly reduced temperature range. Additionally, due to the increased thermal conductivity of the lower density materials, excessive heat may be conducted into the hub assembly of the vehicle to which the brake rotor is attached.

It is desirable to design a brake rotor having equal heat distribution to prevent warping or coning of the brake rotor. It also is desirable to design a brake rotor with greater heat transfer efficiency permitting lower operating temperatures at the rubbing surfaces of the brake rotor. Finally, it is desirable to provide a brake rotor design having sufficient heat management to permit the use of a low density material without transferring excessive heat into the hub assembly of the motor vehicle to which the brake rotor is fastened.

SUMMARY OF THE INVENTION

The present invention provides a brake rotor having a sufficiently equal temperature distribution between the rubbing surfaces of a brake rotor to prevent objectionable warping or coning. Additionally, the brake rotor incorporates a flow through bifurcated ventilation design capable of transferring sufficient heat to prevent the rubbing surface temperatures from exceeding a predetermined minimum. This design enhances the durability of the disc brake assembly and permits the use of low density materials for constructing a low mass brake rotor.

In the presently preferred embodiment, the brake rotor comprises an integral hub portion and inner and outer annular braking portions constructed to be engaged by a pair of brake shoes. The annular braking portions are spaced apart by internal radially extending circumferentially spaced primary fins that define radially extending passages.

These primary fins extend radially outwardly to a point substantially adjacent an outer periphery of the inner and outer annular braking portions. The primary fins also extend radially inwardly beyond an inner periphery of the inner and outer annular braking portions terminating at inwardly extending ends. The inwardly extending ends of the primary fins are integral with the integral hub portion whereby the inner and outer annular braking portions are supported on the integral hub portion.

The primary fins define a series of circumferentially spaced axially extending passages between the inner annular braking portion and the integral hub portion. Each of the axially extending passages is in communication with an inner end of one of the radially extending passages.

The brake rotor of the present invention further includes a circumferentially arranged series of short secondary fins, one of the secondary fins being disposed in an outer end of each of the radially extending passages whereby the radially extending passages are bifurcated.

The inner and outer annular braking portions are of substantially the same radial dimension and thickness, and the primary fins are arranged such that when the brake rotor is engaged by the brake pads, thermal stresses in the brake rotor are minimized by even distribution of heat between the rubbing surfaces and the convective cooling through the axially extending passages and the radially extending passages.

Other objects, features and advantages of the present invention will become apparent to those skilled in the art from the drawings, detailed description and claims which follow.

DESCRIPTION OF THE PREFERRED EMBODIMENT

Figure 1:
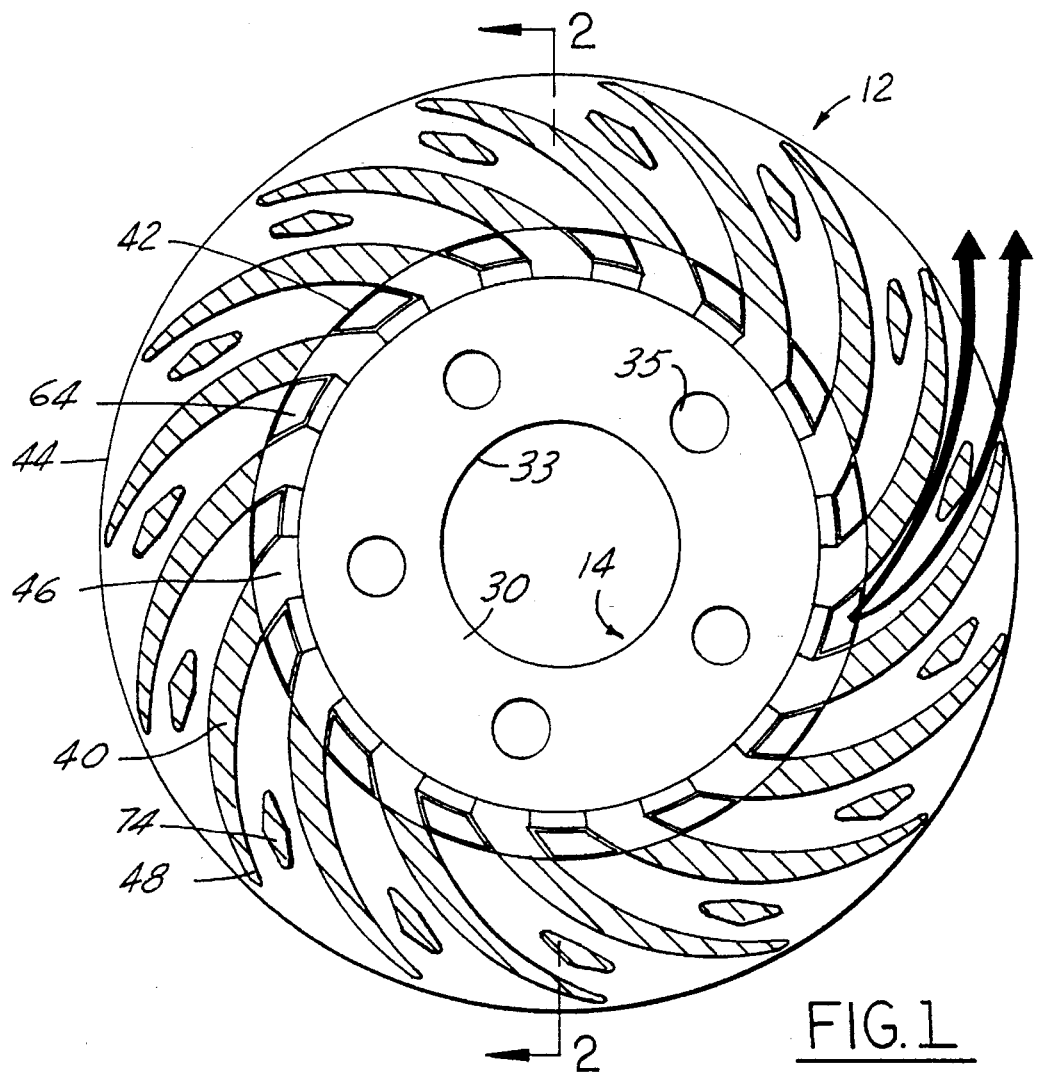
FIG. 1 is an partial sectional view of a brake rotor for use in a motor vehicle according to the present invention.
Figure 2:
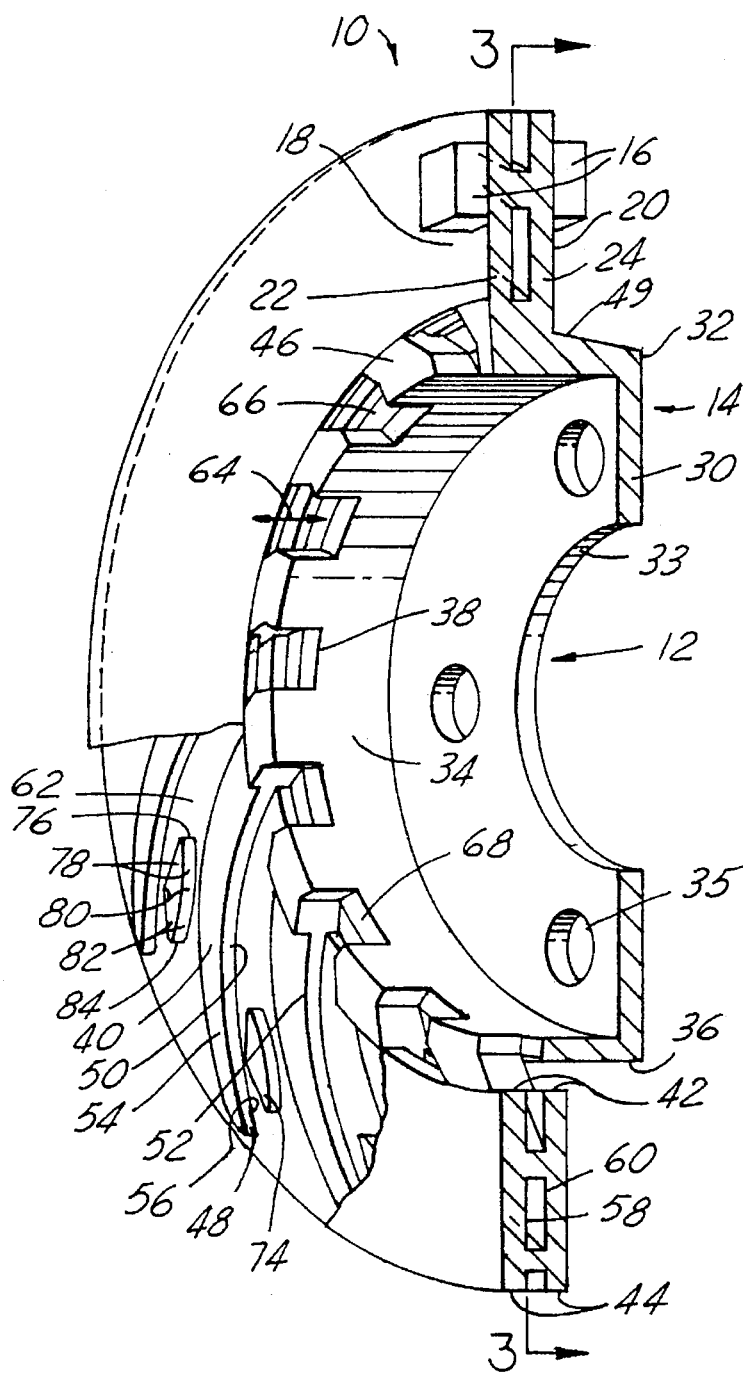
FIG. 2 is a perspective sectional view illustrating a disc brake assembly for use in a motor vehicle according to the present invention.

Referring to FIGS. 1 and 2, a disc brake assembly 10 for use in a vehicle is shown in which the present invention has particular utility.

The disc brake assembly 10 comprises a one-piece hat shaped brake rotor 12, an integral hub portion 14 for rigid attachment to a rotatable hub (not shown). The disc brake assembly 10 includes a pair of friction pads 16 constructed to be applied against the inner and outer rubbing surfaces 18, 20 on inner and outer annular braking portions 22, 24 of the brake rotor 12 by a force applying means, such as a brake caliper (not shown), which moves the pads against the first and second rubbing surfaces 18, 20.

The hub portion 14 of the brake rotor 12 includes planar circular portion 30 at a first end 32 and having a hub aperture 33 and a plurality of stud apertures 35. A generally cylindrical annular portion 34 axially extends generally perpendicularly from an outer periphery 36 of the hub portion 30. The annular portion 34 terminates at a second end 38 of the hub portion 14.

The inner and outer annular braking portions 22, 24, are of substantially the same radial dimension and thickness, and are symmetrically spaced apart by internal radially extending circumferentially spaced primary fins 40. The inner and outer annular braking portions 22, 24 each include inner and outer peripheries 42, 44. The primary fins 40 extend radially outwardly to a point substantially adjacent to the outer periphery 44. The primary fins 40 extend radially inwardly beyond the inner periphery 42 of the inner and outer annular braking portions 22, 24.

The inwardly extending ends 46 of the primary fins 40 are integrally formed with the second end 38 of the cylindrical annular portion 34 of the hub portion 14 where by the braking portions 22, 24 are integrally supported on the hub portion 14. The cylindrical annular portion 34 may include a rib 49, which extends from the inwardly extending end 46 of the primary fin 40 along the cylindrical annular portion 34, tapering towards the first end 32. Each of the primary fins 40 extends outwardly from a inwardly extending end 46 to a tip 48.

Each primary fin 40 also includes first and second cooling faces 50, 52 and first and second sides 54, 56. The portion of the primary fins 40 between the hub portion 14 and the inner periphery 42 of the inner and outer annular braking portions 22, 24 include sufficient strength to support the inner and outer annular braking portions 22, 24 as cantilevered loads from the hub portion 14.

In the preferred embodiment shown, there are fifteen primary fins 40. Each of the primary fins 40 extend accurately from the inwardly extending ends 46 departing from the radial at approximately a 45 degree angle and extending to the tip 48 along an arc having a radius of approximately four inches, however, the present invention is not so limited. The primary fins 40 may extend radially outward along a straight path, or along a different arc than that shown, dependent on the air flow and surface area required for the particular application. Additionally, the primary fins 40 are tapered such that when viewed in an axial direction, the narrowest part of the taper lies at the tip 48.

The cooling faces 50, 52 of the primary fins 40 and the cooling surfaces 58, 60 of the inner and outer annular braking portions 22, 24 define a radially extending air passages 62 which serves as a cooling duct. Where, as in the preferred embodiment, the fins are tapered and accurately formed, so are the radially extending air passages 62. However, the taper of the radially extending air passages 62 is reversed from the primary fins 40. Therefore, the sectional area of the radially extending air passage 62 is greatest adjacent to the outer periphery 44 of the inner and outer annular braking portions 22, 24.

Figure 3:
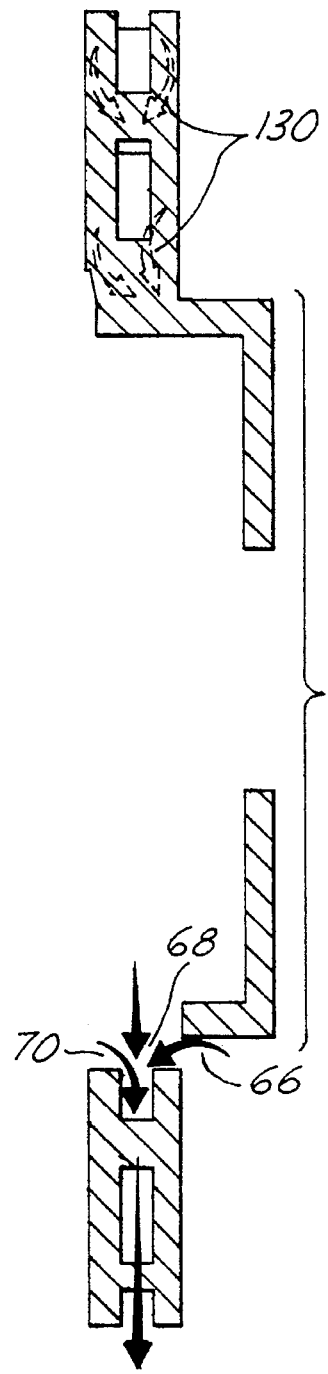
FIG. 3 is a sectional view illustrating heat transfer by convection and conduction within a brake rotor for use in a motor vehicle according to the present invention.

The inner periphery 42 of the inner annular braking portion 22, the second end 38 of the cylindrical portion 34 of the integral hub portion 14 and the primary fins 40 extending therebetween define circumferentially spaced axially extending air passages 64 in communication with the radially extending air passages 62. Ambient air is entrained into each of the radially extending air passages 62 through three portion of an inlet. Referring to FIG. 3, a first inlet portion 66 is disposed between the outer annular braking portion 24 and the second end 38 of the hub portion 14. A second inlet portion 68 is coplanar with the surface of the cylindrical annular portion 34 of the hub portion 14 and the inwardly extending ends 46 of the primary fins 40. A third inlet portion 70 is disposed axially spaced apart from the first inlet portion 66 and is adjacent to the inner periphery 42 of the inner annular braking portion 22.

According to the present invention, where additional convective cooling is desired, a series of circumferentially arranged secondary fins 74 may be centrally disposed within each of said radially extending air passages 62 substantially between the tips 48 of the primary fins 40. The secondary fins 74 have a radial length substantially less than that of the primary fins 40, thereby creating a bifurcated region within the radially extending air passages 62. The secondary fin 74 increases the exposed surface area and reduces the sectional area in the larger region of the radially extending air passage 62. The secondary fin 74 forces the air to flow at increased velocity and in closer proximity to the cooling faces 50, 52 of the primary fins 40.

In the preferred embodiment, the secondary fin 74 is shaped to provide minimal flow resistance, while effectively presenting increased surface area. The secondary fin 74 includes a leading edge 76 and leading surfaces 78, tapering out to separation edges 80. The width of the secondary fin 74 between the separation edges 80 determines the air flow rate through this portion of the radially extending air passages 62. Preferably, the combined cross-sectional area on either sides of the secondary fins is substantially equal to cross-sectional area of the radially extending air passage 62 adjacent to the inner periphery 42 of the inner and outer annular braking portions 22, 24. The secondary fin 74 also includes trailing surfaces 82, which converge into a trailing edge 84.

The brake rotor 12 of the present invention may be constructed from a variety of materials, including steel, cast iron, various metal alloys and composite materials. In the preferred embodiment, the brake rotor 12 is cast in a single piece from an aluminum metal matrix composite material including 359 aluminum and silicon carbide particulate reinforcement. This results in a material with the toughness and low density of aluminum combined with high wear resistance of silicon carbide. The silicon carbide is distributed evenly throughout the brake rotor 12 at a 20% by volume ratio. This material has a density approximately one-third that of cast iron. Additionally, the aluminum metal matrix has a thermal conductivity approximately four times that of cast iron.

Referring to FIG. 3, operation of the disc brake assembly will now be described. As the friction pads 16 are forcibly applied against the first and second rubbing surfaces 18, 20 to slow the motor vehicle, heat is generated by friction at the rubbing surfaces 18, 20. That heat is conducted throughout the brake rotor 12 by conduction as shown by heat conduction arrows 130. To prevent coning and warping of the inner and outer annular braking portions 22, 24, the brake rotor 12 transfers heat to provide an equal temperature distribution between the inner and outer rubbing surfaces 18, 20. This is due to equalized heat conduction paths from the inner and outer annular braking portions 22, 24 into the primary fins 40 and into the integral hub portion 14. In contrast, in a conventional brake disc, one of the rubbing surfaces usually has a significantly more direct line of thermal conductivity into the hub portion, which results in greater heat transfer from that rubbing surface, thereby creating substantial lateral thermal gradients between the two rubbing surfaces. This is particularly so in conventional brake discs made of aluminum which has a high coefficient of thermal conductivity.

Simultaneously, heat is transferred away from the brake rotor by convection. As cooling air is entrained through the inlet, and rushed over the cooling faces 50, 52 of the primary fins 40 and the first and second cooling surfaces 58, 60 of the inner and outer annular braking portions 22, 24 to promote additional heat extraction from the brake rotor 12. In the preferred embodiment, there is also a secondary fin 74 upon which the air impinges, thus maintaining adequate air velocity at both cooling faces of 50, 52 of the primary fins 40 to withdraw additional heat.

Figure 4:
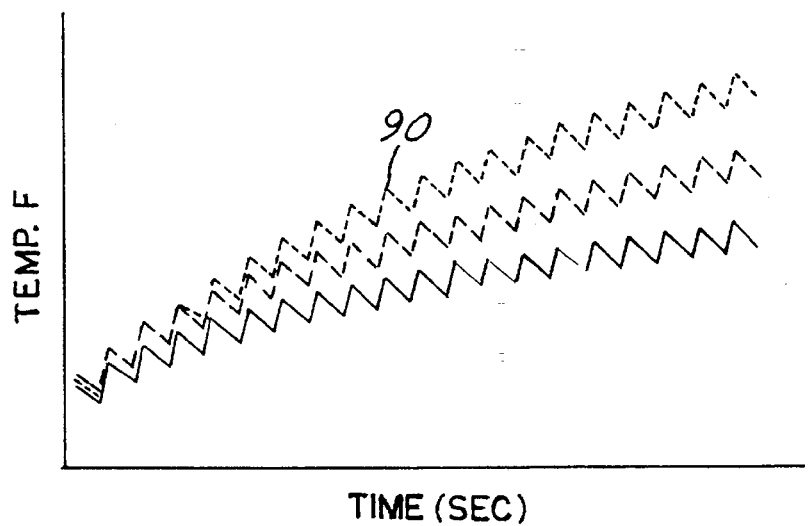
FIG. 4 illustrates a comparison of the temperature at the rubbing surface of various brake rotors subjected to repeated stops within a given period of time.

Referring to FIG. 4, graphical data representing the performance of three alternative brake rotor 12 designs subjected to a standard fade test is shown. The standard fade test involves accelerating to a predetermined speed, braking and repeating the cycle a predetermined number of times. FIG. 4 illustrates the performance results of tests comprising twenty high speed severe stops executed over a pre-determined time period. Line 90 illustrates the performance of a conventional brake rotor made of cast iron. Line 92 illustrates the performance of a brake rotor of conventional design (i.e., the same configuration as the steel brake rotor illustrated in line 90) constructed from the aluminum metal matrix composite material. The lower temperatures result from the increased thermal conductivity of the material.

Line 94 illustrates an aluminum metal matrix composite brake rotor constructed in accordance with the present invention illustrated in FIGS. 1, 2 and 3. A significant reduction in temperature results due to the increased thermal conduction of the aluminum metal matrix composite material combined with the highly efficient heat convection design. In addition to operating at cooler temperatures, the brake rotor design of this invention has uniform temperature gradients whereby the tendency to warp is greatly reduced.

Various other modifications and permutations of the present invention, no doubt, will occur to those skilled in the art. Therefore, it is the following claims, including all equivalents, which define the scope of the present invention.

What is claimed:

1. A one-piece ventilated brake rotor for a disc brake assembly for use in a motor vehicle, said brake rotor comprising:

an integral hub portion and inner and outer annular braking portions constructed to be engaged by a pair of brake shoes;

said annular braking portions being spaced apart by internal radially extending circumferentially spaced primary fins that define radially extending passages;

said primary fins extending radially outwardly to a tip substantially adjacent an outer periphery of said inner and outer annular braking portions;

said primary fins extending radially inwardly beyond an inner periphery of said inner and outer annular braking portions terminating at inwardly extending ends;

said inwardly extending ends of said primary fins extending from said inner and outer annular braking portions to said integral hub portion, said inwardly extending ends of said primary fins being operative as cantilever supports for said inner and outer annular braking portions;

said inwardly extending ends of said primary fins defining a series of circumferentially spaced inlets, each inlet includes a first, second and third inlet portion disposed between said annular braking portions and said integral hub portion, each of said inlets being in communication with one of said radially extending passages;

said primary fins being generally arcuate and having a taper when viewed in an axial direction, said taper being narrowest at radially outer ends of said primary fins, whereby said air passages have a generally arcuate configuration; and a circumferentially arranged series of short secondary fins, one of said secondary fins being disposed in an outer end of each of said radially extending passages where by bifurcating said radially extending passages and providing a combined cross-sectional area substantially equivalent to that of said inner end of said radially extending passages;

said inner and outer annular braking portions being of substantially the same radial dimension and thickness, and said primary fins being arranged whereby when the brake rotor is being engaged by said brake pads, thermal stresses in said brake rotor are minimized by even thermal conduction of heat between said inner and outer annular braking portions and convective cooling through said axially extending passages and said radially extending passages.

2. A brake rotor apparatus according to claim 1, wherein said brake rotor comprises a metal matrix composite of 359 aluminum with a twenty percent by weight silicon carbide particulate distributed throughout.

\* \* \* \* \*